United States Patent [19]

Heiser

[11] Patent Number: 4,596,118
[45] Date of Patent: Jun. 24, 1986

[54] HYDROSTATIC SELF-REGULATING DRIVE SYSTEM

[75] Inventor: Joachim Heiser, Portsmouth, Great Britain

[73] Assignee: Robert Bosch GmbH, Stuttgart, Fed. Rep. of Germany

[21] Appl. No.: 678,002

[22] Filed: Nov. 30, 1984

[30] Foreign Application Priority Data

Jan. 12, 1984 [DE] Fed. Rep. of Germany ....... 3400885

[51] Int. Cl.⁴ ...................... B60K 41/16; B60K 17/10
[52] U.S. Cl. .......................................... 60/431; 60/447
[58] Field of Search ................................... 60/431, 447

[56] References Cited

U.S. PATENT DOCUMENTS 4,149,380 4/1979 Nonnenmacher ................ 60/447 X

Primary Examiner—Gerald A. Michalsky
Attorney, Agent, or Firm—Michael J. Striker

[57] ABSTRACT

A hydrostatic drive system has an internal combustion engine, a main pump driven by the engine and having a control element displaceable to vary the pump displacement, a control pump driven by the engine, an output motor having a control element displaceable to vary the motor displacement and having a rotary output, and conduits interconnecting the main pump and output motor for driving of the motor by the pump. A speed-measuring pump is connected to the motor output and produces a pressure differential corresponding to the speed of the motor output. A pump controller is powered by the control pump and connected to the pump control element for adjusting the pump displacement. A motor controller is connected to the motor control element for adjusting the motor displacement. An engine controller includes a first engine cylinder connected to the speed-measuring motor and operable thereby for adjusting the engine speed and a second engine cylinder connected to the control pump and operable thereby for affecting engine speed.

4 Claims, 4 Drawing Figures 4,596,118

HYDROSTATIC SELF-REGULATING DRIVE SYSTEM

FIELD OF THE INVENTION

The present invention relates to a hydrostatic drive system. More particularly this invention concerns such a drive which has an output which can be rotated normally in either direction at a steplessly variable speed and that has an input that typically is variable within a fairly limited range.

BACKGROUND OF THE INVENTION

A hydrostatic transmission is typically used to drive an output at a steplessly variable and normally reversible rate from a prime mover whose output rotation rate is normally one-way and of limited variability. Such an arrangement is particularly useful with, for instance, a diesel engine which only runs efficiently over a very limited speed range, the reason why diesel equipment, when equipped with a standard transmission, must have a great many different gears so as to maximize fuel efficiency.

Such systems are typically relatively complex and require that the engine be adjusted by the operator independently of the desired operating speed.

OBJECTS OF THE INVENTION

It is therefore an object of the present invention to provide an improved hydrostatic drive.

Another object is the provision of such a hydrostatic drive which overcomes the above-given disadvantages, that is which is of simple construction and automatic operation.

SUMMARY OF THE INVENTION

A hydrostatic drive system according to the invention has an internal combustion engine, a main pump driven by the engine and having a control element displaceable to vary the pump displacement, a control pump driven by the engine, an output motor having a control element displaceable to vary the motor displacement and having a rotary output, and conduits interconnecting the main pump and output motor for driving of the motor by the pump. A speed-measuring pump is connected to the motor output and produces a pressure differential corresponding to the speed of the motor output. A pump controller is powered by the control pump and connected to the pump control element for adjusting the pump displacement. A motor controller is connected to the motor control element for adjusting the motor displacement. An engine controller includes a first engine cylinder connected to the speed-measuring motor and operable thereby for adjusting the engine speed and a second engine cylinder connected to the control pump and operable thereby for affecting engine speed.

Thus with the system of this invention the engine speed is varied in accordance with the desired operating speed, but only once the adjustment capability of the pump and motor are exhausted, so that the system can be very fuel efficient. Only when necessary is the engine speeded up to increase output speed or torque, and otherwise it operates at the lowest efficient speed.

According to another feature of this invention the motor control means includes a motor cylinder connected to the motor control element and a proportional valve connected between the control pump and the motor cylinder and pressurized on one side by the speed-measuring motor and on the other side by the main pump.

In addition the system of this invention has respective pressure-relief valves connected to the conduits and to the pump control means for changing pump displacement when the pressure in either conduit exceeds the limit of the respective relief valve and a changeover valve between the conduits and the motor control means for varying motor displacement when pressure in either conduit exceeds the limit of the respective relief valve.

DESCRIPTION OF THE DRAWING

The above and other features and advantages will become more readily apparent from the following, reference being made to the accompanying drawing in which.

SPECIFIC DESCRIPTION

Figure 1:
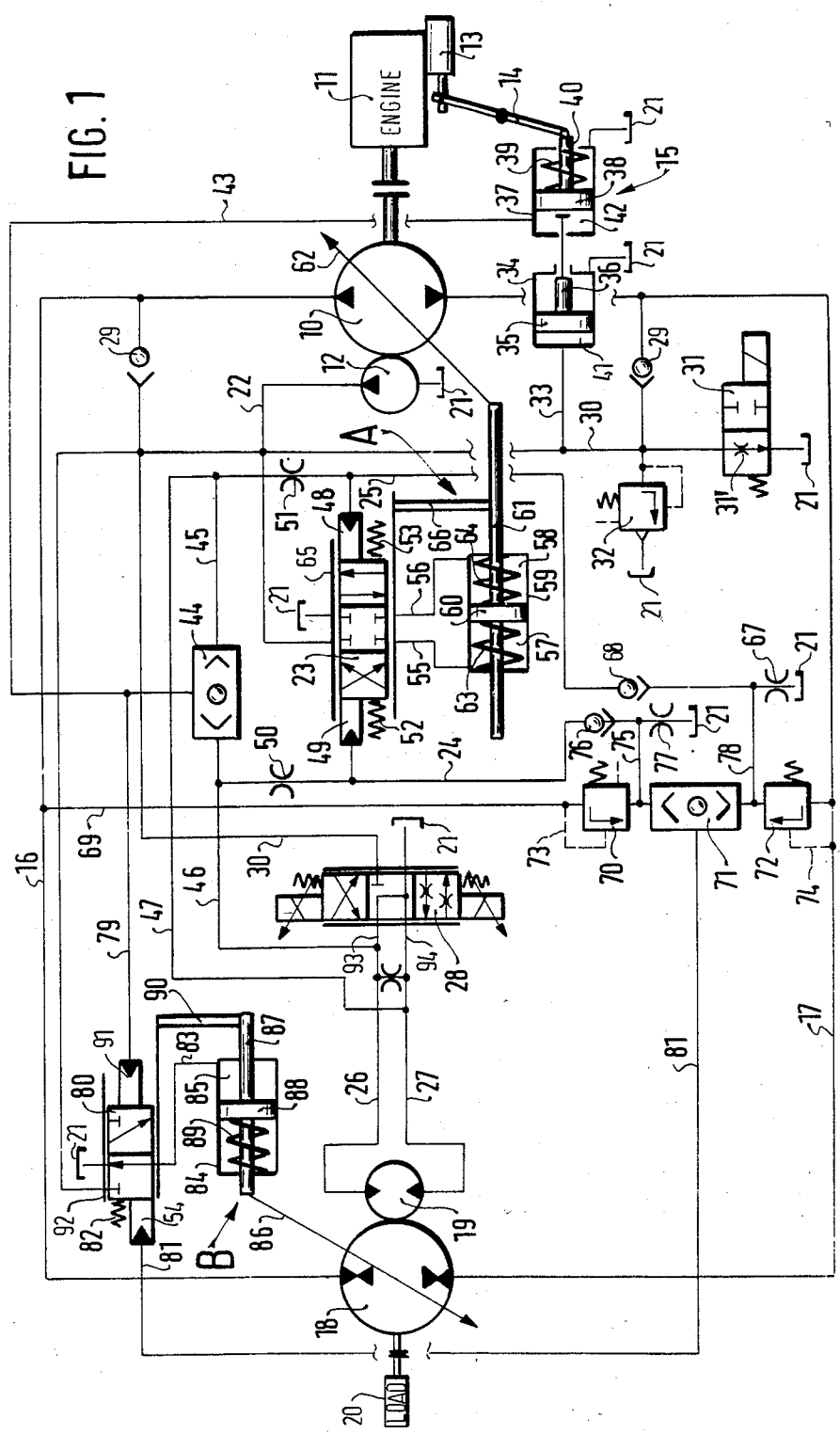
FIG. 1 is a schematic representation of the drive system of this invention.

As seen in FIG. 1 the drive system has a prime mover, here a diesel engine 11, directly connected to the rotor of a reversible axial-piston pump 10 having a control element or swash plate 62 displaceable to vary the pump's volume/time displacement. Main lines 16 and 17 connected to opposite sides of the pump 10 are connected to a similar hydraulic motor 18 having a control element 86 and connected to a load 20. Pressure in the main lines 16 and 17 is limited by respective pressure-relief valves 70 and 72, the former of which is connected via a line 69 to the line 16 and the latter of which is directly connected to the line 17. These valves 70 and 72 have respective pilot lines 73 and 74 and are connected via respective restrictions 77 and 67 to a sump 21. They open only when the pressure in the respective line 16 or 17 exceeds a predetermined minimum pressure.

The output side of the valve 23 is connected via lines 55 and 56 to compartments 57 and 58 defined in a double-acting cylinder 59 by a piston 60 that is biased by springs 63 and 64 into a central position. This piston 60 has a rod 61 connected via a link 66 to the port-forming housing 65 of the valve 23 and to the control element 62, so that the displacement of the pump 10 is controlled by the valve 23 with a self-correcting action resulting from the use of a link 66 between the piston rod 61 and housing 65. The valve 23 and actuator cylinder 59 constitute the control unit A for the pump 10.

In the illustrated central position of the valve the lines 55 and 56 are both cut off so that the piston 60 will be urged by the springs 63 and 64 into a neutral position. The valve 23 can be pushed into one end position by the actuator 48 against the force of the spring 52 to connect the compartments 57 and 58 respectively to the pressurized line 22 and sump 21, pushing he piston 60 to the right and correspondingly shifting the swash plate 62. The valve 23 is, however, a proportional valve which can be opened and closed gradually and steplessly. Normally a spool valve is suitable.

The line 30 that is connected to the line 22 opens via a line 33 into a chamber 41 of a single-acting cylinder 34 having a piston 35 whose rod 36 is engaged coaxially with another piston 38 in another single-acting cylinder 37. The chamber 42 of this cylinder 37 is connected to the line 43 that leads to the output of the valve 44. A spring 39 urges the piston 38 against the rod 36, that is into a position reducing the volume of the chamber 42, and the piston 38 has a rod 40 connected via the link 14 to the injection unit 13. Thus the cylinders 34 and 37 together constitute the actuator 15.

A shutoff valve 44 has one input connected to the line 46 and another input connected via a line 45 to the line 47 and has output lines 43 and 79 which carry the pressure of whichever line 26 or 27 is at higher pressure. Another such valve 71 is connected between the lines 75 and 78 to feed to its output line 81 the pressure of whichever of these lines is at higher pressure.

A three-port two-position proportional valve 80 connected on one side to the control line 22 and the sump 21 and on the other side via a line 83 to a chamber 85 of a single-acting cylinder 84. The valve 80 is urged into a position connecting the chamber 85 to the sump by a spring 82 and a hydraulic actuator 54 fed from the line 81 and is urged into the opposite position connecting the chamber 85 to the line 22 by an actuator 91 connected to the line 79 from the valve 44. The cylinder 84 has a piston with a rod 87 connected via a line 90 to the housing 92 of the valve 80 and connected to the swash plate 86 of the motor 18. A spring 89 urges the piston 88 in a direction decreasing the size of the compartment 85 and also is effective via the link 90 on the valve housing 92. This cylinder 84 therefore constitutes the motor actuator B.

Figure 2:
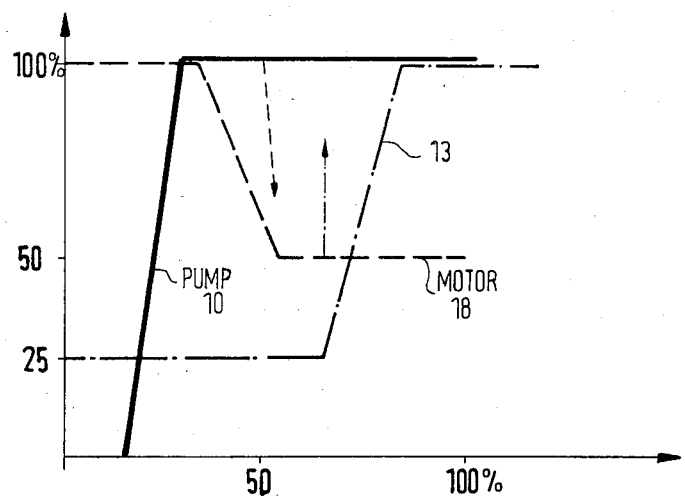
FIGS. 2, 3, and 4, are diagrams showing the operation of the system of the invention.

The diagram of FIG. 2 shows the adjustment ranges of the pump 10 and motor 18. The abscissa shows in percent the control pressure difference created by control variation. The ordinate shows in percent the position of the swash plate of the pump 10 as a solid line, the position of the control element 86 of the motor 18 as a dashed line, and the position of the speed controller 13 as a dot-dash line. As will be described below, the point at which the solid pump line deflects is determined by the relative forces of the springs 52 and 53, the point at which the dashed motor line deflects is mainly determined by the force of the spring 82, and the point at which the dot-dash pump line deflects is mainly determined by the setting of the valves 70 and 71. In operation the pump displacement is first varied, if this is not enough the motor displacement is also varied, and if this is not enough the speed controller 13 is used.

Figure 3:
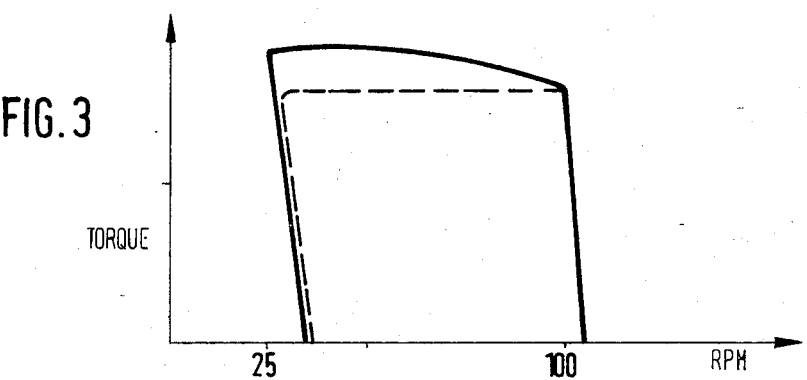

The diagram of FIG. 3 is of a diesel engine with a speed controller. The abscissa represents the speed or rotation rate in percent and the ordinate the torque in percent. This torque curve therefore shows that the engine runs most efficiently, that is produces the most torque for the speed, when running at between 25% and 100% of the nominal or rated speed of the engine. Since fuel consumption is proportionately less at lower speeds, it is therefore desirable to run the engine 11 at the lowest possible RPM to operate the load 20.

Figure 4:
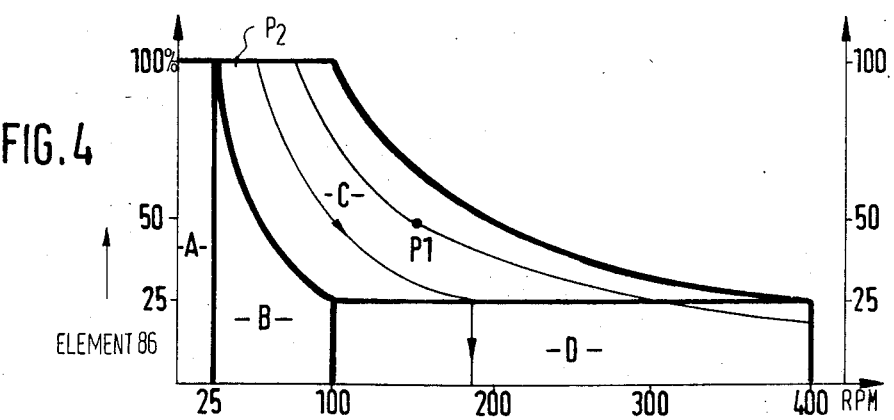

The diagram of FIG. 4 shows the characteristic field of the hydrostatic drive according to this invention. The abscissa shows in percent the output RPM, the speed the rotor of the pump 18 turns at as compared to the engine RPM, in other words at 100% the pump output is turning the same speed as the motor and at 200% it is turning twice as fast. The ordinate shows torque in percent, as for instance a function of the angular position of the swash plate. The region A is the adjustment range for the pump 10, region B is the adjustment range of the pump 10 and of the motor 18, region C is the adjustment range of the engine-speed controller 13 at maximum pressure, and D is the adjustment range of the speed controller 13 at partial load. Thus with the system of this invention the engine speed is only increased when the pump 10 and motor 18 can no longer produce a higher output speed.

The system operates as follows:

Idling

The operating cylinders 34 and 39 forming the actuator 15 of the speed controller of the engine 11 establish, when the valve 31 is open and the lines 30 and 33 virtually depressurized, a minimal idle speed that is just enough to keep the engine from stalling. The cylinder 59 for the idling system is in its center position. The necessary starting torque is equal to the losses of the pump 10 and and of the pump 12 whose flow is back through the valve 31 to the sump 21.

Starting

To get up to the minimum full-load speed of 25%, at the lower end of the efficient operating range illustrated in FIG. 3, the valve 31 is switched to the blocking position. This action causes pressure in the conduits 22, 30, and 33 to build up to the level determined by the relief valve 32. The increased pressure pushes out the piston 35 which in turn pushes out the piston 38, thereby acting on the speed regulator 13 and increasing engine speed to 25% of maximum, at which time the piston 35 bottoms in the cylinder 34. So long as any appreciable pressure is present in the conduit system 22, 30, 33 the piston 35 will hold in this position and thereby establish the minimum permissible full-load speed of the engine 11. The solenoid valve 31 is therefore only open when the engine 11 is idling.

Running

In the region A of FIG. 4 the load and output speed of the diesel engine 11 are less than 25%. This desired pressure differential is generated at the outputs 93 and 94 of the valve 28, but normally with a sign opposite that produced by the motor 19 at the desired speed so that at this speed there is no pressure differential between the lines 26 and 27. The actual value of the output speed is established by the motor 19 as a control-pressure differential in the lines 26 and 27 that is added to that in the lines 93 and 94 and that has a sign dependent on the direction the load 20 is being rotated in. Up to an output speed of 25% of the motor 18 the angle of the pump 10 is shifted from 0% to 100% as shown in FIG. 2. The necessary control-pressure differential produced by the motor 19 is below 25%.

In the region B the loading of the diesel engine is still less than 25% and its rotation rate is also at 25%. Region B is traversed by setting the motor 18 back from 100% to 25% displacement. The desired pressure 19 produced at the motor 19 is effective through the lines 46 and 47 on the valve 44 and through same and the conduit 79 on the actuator 91 of the valve 80, but remains somewhat under 50%. The opposite actuator 54 of the valve 80 is connected via the line 81 to the valve 71 and therethrough to the sump 21 via the line 75 and restriction 77. The pressure in the line 79 increases until fluid flows from the line 22 via the line 83 to the actuator b to tip the motor 18 into a position of smaller displacement. Thus the displacement of the pump 10 is decreased, as is that of the motor 18 in this region B.

In the region D the pump is set fully back and reaches the speed limit of 100% with 25% torque. A higher output speed can no longer be obtained by operation of the pump 10 and motor 18 alone. With a high desired value there is an increase in the pressure differential between the lines 46 and 47 with the effect seen in FIG. 2. This control-pressure differential is fed out of the valve 44 via the line 43 to the actuator 15 so as to actuate the controller 13 and set the engine speed from 25% to 100% of its rated speed. Thus the entire hydrostatic drive reaches the limits of the output speed of 400%. The field D lies in the range determined by the engine 11.

In the region C which upwardly delimits the regions B and D as seen in FIG. 4 the maximum permissible operational pressures are achieved. These should not be exceeded. As seen in FIG. 4 the drive point of the region D is shown on the pressure limit at $P_2$. This is at a rotation of the diesel engine 11 of about 35% and a pressure of 100%. The output torque is 25%. An increase of the load torque to 15% with a constant desired speed gives a new drive point P1. Then one of the valves 70 or 72, depending on direction, opens and the liquid backed up by the respective restriction 67 or 77 is effective through the valve 71 on the actuator 54 to set back the valve 80 and increase the displacement of the motor 18.

This operation is linked with a reduction of rotation speed which is signaled by an increase in the control-pressure differential that sets the speed controller 13 to a higher speed. The new drive point P1 is obtained with a diesel speed of 75%. An analog process takes place when in the field B the drive torque crosses the the curve representing maximum pressure.

Pressure cutoff is achieved as described when the drive reacts to increasing load torque by pivoting over the swash plate 86 until the engine 11 is running at 100% of its nominal speed and is delivering 100% of its maximum torque. Any further increase in control pressure will exceed that of the valve 70 or 72 and adjust the swash plate 86 and will increase pressure in the lines 81 and 24 or 25. This pressure increase in the line 24 or 25 will also be effective in the valve 23 to push it back into its central position, thereby reducing the displacement of the pump 10 until the load pressure in the line 24 or 25 balances that in the line 48 or 49, thereby restabilizing the valve 23 and the cylinder 59 for the pump 10. Meanwhile there is continuous flow of control fluid from the through the restriction 67 or 77 to the sump 21.

Deceleration

Reducing the desired rotation speed by appropriate adjustment of the proportional valve 28 decelerates the system by reducing the reversal of the control-pressure difference. The pump 10 and the motor 18 are returned to their starting positions. Sudden deceleration even reverses the pressure difference between the conduits 46 and 47, that is reversing the sign of this pressure differential, and oppositely shifting the valve 23 to cause a sudden pressure buildup in the lines 17 or 43. If the pressure in the system increases past the maximum permissible the valve 23 will respond as described above to reset the pump 10, bringing about a new equilibrium in the pump 10. The resultant braking action is achieved by driving the pump 10 as a motor, the reduced displacement causing it to rotate fairly rapidly. Since the sign of the pressure differential between the lines 46 and 47 is not recognized by the engine 11 as a result of the valve 44, the speed controller 13 is set at its maximum desired value with extreme deceleration. The maximum braking moment of the engine is in any case above its maximum rotation speed.

Acceleration

The maximum possible acceleration moment is defined by the upper edge of the fields A and D in FIG. 4. It is therefore desirable that this condition be achieved at all times for acceleration.

The rotation-controlled drive as described above to limit the maximum moment during acceleration. Increasing the desired speed rapidly, by widely adjusting the valve 28, creates a substantial pressure differential in the lines 46 and 47, with the result of increasing the rotation rate of the engine 11 by means of the valve 23. Since the adjustment by means of the cylinder 37 on the controller 13 is faster than the adjustment via the cylinder 59 of the pump 10, the motor can to start with be raised with little torque to a high rotation rate on acceleration. As a balance comes between the pump 10 and motor 18 the rotation rate of the engine 11 the rotation rate of the moment is dropped to the lowest possible value, the kick-down effect.

Acceleration is limited by limiting the rate of change of the control point created by the valve 23. This limitation can be dependent on displacement direction when, as is intended here, the drive is set up to move a vehicle, and also on the ground speed of the vehicle. The valve 28 is operated by solenoids whose electrical operating signals can be made proportional to ground speed to achieve this end.

An advantage of the hydrostatic drive described above is that the pump is automatically unloaded during starting of the engine. The diesel engine always run at the rate of lowest possible fuel consumption. In addition there need be no separate operation or actuation for this engine. If the control pressure fails, as for instance if a line bursts, the engine will slow down to its lowest possible speed for maximum safety. Finally when accelerating the vehicle with drive well.

I claim:
1. A hydrostatic drive system comprising:
  an internal combustion engine;
  a main pump driven by the engine and having a control element displaceable to vary the pump displacement;
  a control pump driven by the engine;
  an output motor having a control element displaceable to vary the motor displacement and having a rotary output;
  conduits interconnecting the main pump and output motor for driving of the motor by the pump;
  a speed-measuring pump connected to the motor output and producing a pressure differential corresponding to the speed of the motor output;
  pump control means powered by the control pump and connected to the pump control element for adjusting the pump displacement;
  motor control means connected to the motor control element for adjusting the motor displacement; and
  engine control means including a first engine cylinder connected to the speed-measuring motor and operable thereby for adjusting the engine speed and a second engine cylinder connected to the control pump and operable thereby for affecting engine speed.

2. The drive system defined in claim 1 wherein the motor control means includes
   a motor cylinder connected to the motor control element; and
   a proportional valve connected between the control pump and the motor cylinder and pressurized on one side by the speed-measuring motor and on the other side by the main pump.
3. The drive system defined in claim 1, further comprising:
   means including respective pressure-relief valves connected to the conduits and to the pump control means for changing pump displacement when the pressure in either conduit exceeds the limit of the respective relief valve; and
   a changeover valve between the conduits and the motor control means for varying motor displacement when pressure in either conduit exceeds the limit of the respective relief valve.
4. A hydrostatic drive system comprising:
   an internal combustion engine having a control element displaceable to vary engine speed;
   a main pump driven by the engine and having a control element displaceable to vary the pump displacement;
   a control pump driven by the engine;
   an output motor having a control element displaceable to vary the motor displacement and having a rotary output;
   conduits interconnecting the main pump and output motor for driving of the motor from the pump;
   a speed-measuring pump connected to the motor output and producing a pressure differential corresponding to the speed of the motor output;
   a speed-setting valve connected to the speed-measuring pump for varying the pressure differential created thereby in accordance with desired speed;
   pump control means including
      a pump valve powered by the control pump, and
      a pump cylinder connected to the pump control element and pressurizable therethrough,
      actuators connected to the speed-measuring pump and effective to apply the pressure differential across the pump valve for adjusting pump displacement in accordance with desired speed;
   motor control means including
      a motor valve powered by the control pump, and
      a motor cylinder connected to the motor control element and pressurizable therethrough,
      respective actuators connected to the speed-measuring pump and to the conduits adjusting motor displacement in accordance with both the desired speed and the pressure in the conduits;
   engine control means including
      an idle cylinder connected to the engine control element and to the control pump and pressurizable by the control pump for establishing a predetermined minimum engine speed, and
      an engine cylinder connected to the speed-measuring pump for varying engine speed in accordance with desired speed; and
   valve means connected between both conduits and the pump valve for reducing pump displacement when the pressure in the conduit exceeds a predetermined limit.

* * * * *